United States Patent
Hiraoka et al.

(10) Patent No.: US 6,455,160 B1
(45) Date of Patent: Sep. 24, 2002

(54) HIGH PURITY C/C COMPOSITE AND MANUFACTURING METHOD THEREOF

(75) Inventors: Toshiharu Hiraoka, Kagawa (JP); Tsuyoshi Matsumoto, Kagawa (JP)

(73) Assignee: Toyo Tanso Co., Ltd., Osaka (JP)

( * ) Notice: Subject to any disclaimer, the term of this patent is extended or adjusted under 35 U.S.C. 154(b) by 0 days.

(21) Appl. No.: 09/517,006

(22) Filed: Feb. 28, 2000

(51) Int. Cl.$^7$ ................................................ B32B 9/00
(52) U.S. Cl. ........................ 428/408; 442/179; 117/20; 117/900; 423/447.1; 423/447.2; 423/447.3
(58) Field of Search ................................. 428/289, 290, 428/272, 408, 34.1; 156/148, 429; 442/179; 423/447.1, 447.2, 447.3

(56) References Cited

U.S. PATENT DOCUMENTS 5,616,175 A * 4/1997 Walsh ........................ 117/14
5,683,281 A * 11/1997 Metter ........................ 442/179
5,800,924 A * 9/1998 Metter ........................ 428/408
6,136,094 A * 10/2000 Yamaj et al. ............... 117/200

FOREIGN PATENT DOCUMENTS

WO    WO 91/04954    4/1991

* cited by examiner

Primary Examiner—Merrick Dixon
(74) Attorney, Agent, or Firm—Oblon, Spivak, McClelland, Maier & Neustadt, P.C.

(57) ABSTRACT

The high purity C/C composite formed by graphitizing a molded member packed with carbon fibers and carbon material of a matrix. The carbon fibers are high purified under halogen gas atmosphere. The purified carbon fibers are molded into the desired shape on a tool or in die with infiltrating the matrix. The molded member packed with carbon fibers and carbon material of the matrix are either independently or simultaneously graphitized and then high-purification under halogen gas atmosphere. According to the present process, the metal impurities can be very low contents.

17 Claims, 2 Drawing Sheets

HIGH PURITY C/C COMPOSITE AND MANUFACTURING METHOD THEREOF

TECHNICAL FIELD

The present invention is directed to high purity carbon fiber reinforced carbon composite (C/C composite) with lowering impurities content by high purity treatment. More particularly, the present invention is directed to high purity C/C composite of using high purity carbon fibers which was high purified at carbon fiber stage and manufacturing method thereof.

BACKGROUND OF THE INVENTION

FIG. 2 shows a pulling single crystal apparatus used in the Czochralski process (CZ process) for manufacturing a single crystal ingot for use as a material of the semiconductor wafer and the like. As shown in FIG. 2, the CZ apparatus is so structured that a raw material in a quartz crucible 1 is heated to a high temperature by a heater 2 disposed around the quartz crucible 1 so that the raw material can be converted into the melt 3 which is pulled under vacuum pressure to form the single crystal ingot 4.

The structural elements, such as a crucible 5 supporting the quartz crucible 1 and an upper ring 6, an inner shield 7 and others which are subjected to radiant heat of the heater 2, are exposed to high temperature when pulling a single crystal ingot 4 from the quartz crucible 1 within a molten silicon. Accordingly, the structural elements must be formed of a material that can maintain a prescribed mechanical strength under high temperature. Further, the structural elements must be formed of a material of high-purity, because impurities, such as metals, contained in the structural elements become a cause of crystal defects in orientation of the solidifying of the single crystal ingot 4 and also become a factor of reduction of purity, when leaked during manufacturing. In general, a high purity graphite having excellent mechanical properties at high temperature and having high-purity is used for the structural elements of the CZ apparatus (Japanese Patent Publication No. Hei 6(1994)-35325).

Recently, with increasing diameter of the single crystal, the single crystal pulling apparatus used in the CZ process is increased in size. This produces a handling problem caused by the increased weights for the existing graphite elements and a problem of reduction in effective processing size of the inside of the apparatus.

The C/C composite has properties of lightweight and strong mechanical strength, as compared with the graphite material. By virtue of this, even when reducing in thickness, the structural elements of the C/C composite can have a strength equal to those of the graphite material, to enable an effective use of a processing chamber of the apparatus. In addition, by virtue of being lightweight, a good handling can be achieved in, for example, placement in the apparatus. By virtue of these, the crucible components used in the CZ apparatus having a large diameter are now moving from those made of the graphite to those made of the C/C composite.

However, the C/C composite was difficult to high purity for the CZ apparatus in comparison with the graphite. Then, such a problem is not only for the CZ apparatus in the semiconductor industry. An atomic energy field, aviation and universe fields have also the same problem.

SUMMARY OF THE INVENTION

In the object of the present invention to provide a high purity C/C composite with lowering contents of metal impurities with high mechanical properties at high temperature and manufacturing method thereof.

To accomplish the above the object, the high purity C/C composite formed by graphitizing a molded member packed with carbon fibers and carbon material of a matrix. The carbon fibers are high purified under halogen gas atmosphere before graphitizing. The purified carbon fibers are molded into the desired shape on a tool or in die with infiltrating the carbon material of the matrix. The molded member packed with carbon fibers and carbon material of the matrix are either independently or simultaneously graphitized with the high-purification under halogen gas atmosphere.

The carbon material of the matrix infiltrated carbon fiber become into graphite fiber after graphitizing. The carbon material of the matrix around the graphite fibers are also became into graphite and coated the graphite fibers. The inventive high-purity C/C composite consists of two graphite, namely, the high-purity graphite fibers and the high-purity graphite matrix. According to the structural of the C/C composite, the metal impurities may be difficult to dissolve from the inside of the graphite fibers.

Therefore, for example, the C/C composite was high purified under halogen gas at one time after graphitizing the molded C/C composite whose are structured to coat the graphite matrix on the graphite fibers. Accordingly the structure, the C/C composite may be mainly purified around the outside surface of the graphite matrix, and the impurities of the inside of the graphite matrix and of the graphite fibers may be difficult to purify in the purification process of these. The graphite fibers of the present invention is high purified because of the fibers are purified under halogen gas atmosphere before molding and graphitizing, and then the graphitized and the molded C/C component are either independently or simultaneously graphitized with high-purification under halogen gas atmosphere. An ash content of the C/C composite is 5 to 100 ppm, more preferably 5 to 30 ppm.

The carbon fibers may be used polyacrylonitrile (PAN), rayon or pitch. The impurities content (ash content) of the carbon fiber may be not more than 100 ppm, and more preferably 80 ppm, and more preferably 60 ppm because of the impurities content of the C/C composite is not more than 20 ppm. The carbon fibers may be high purified before or after infiltrating with the matrix.

The matrix may be used carbon including resin and/or pyrolytic carbon (PyC). The resin may be selected from the group including phenol (resole, novolak), furan, polyimide, polyamide-imide, polyether imide, polycarbodiimide and bisallyldiimide or combination thereof may be used within the range within which its property is not impaired. Solvent may be used in combination, when necessary. The material gas of the PyC may be selected from the group including aliphatic hydrocarbon as methane and propane, aromatic hydrocarbon as benzene, toluene and xylene and chlorine including hydrocarbon as dichloroethylene, dichloromethane, trichloromethane and trichloroethylene or combination thereof may be used within the range within which its property is not impaired.

The high purity C/C composite can be used for the structure member of the CZ apparatus, which manufactures bulk crystal as shown in FIG. 2. In FIG. 2, it can be used for crucible 5, upper ring 6, inner shield 7, lower ring 8, lower heater 9, thermal insulator 10 and spiltray 11. Furthermore, the high purity C/C composite can be used for the plasma confrontation the first wall of the nuclear fusion device for the atomic energy, the tile of divertor, the material for the universe aviation, and so on.

DETAILED DESCRIPTION OF THE INVENTION

The manufacturing process of the high-purity C/C composite of the present invention is separating as a molding carbon fibers, a first high purification process of the carbon fibers, a densification, a baking and a carbonization, a graphitization and a second high purification process.

The first high purification process of the carbon fibers was treated at heating temperature of 1,800 to 2,200° C. for heating time of 5 to 30 hours under halogen gas atmosphere. The second high purification process was treated at heating temperature of 2,000 to 2,400° C. equal to or higher than the first high purification process temperature by 100 to 200° C. for heating time of 5 to 30 hours under halogen gas atmosphere. The first high purification process can be disposed every time before graphitization.

The carbon fibers were high purified in the first high purification process before the graphitization. Accordingly, the carbon fibers of the graphitized member can be very high purity. Therefore, the C/C composite which comprising the carbon fibers and the matrix can be very high purity by high-purified to the matrix in the second high purification process.

The densification process is desirable to densify with the matrix by repeating the infiltrating process, the graphitization and the second high purification process. The matrix of the each infiltrated thereof can be high purified every time after the densification. Accordingly, the matrix of the C/C composite can be high purified in comparison with conventional C/C composite.

The infiltrating process is desirable to impregnating with the PyC by Chemical Vapor Infiltration (CVI), because of CVI can be prevented impurities contaminating to the member. Therefore, it is because it can get the C/C composite under the condition which high purity turns to all the more because of the impurities, which exist in the depths of the matrix, are decreased before graphitization.

Figure 1:
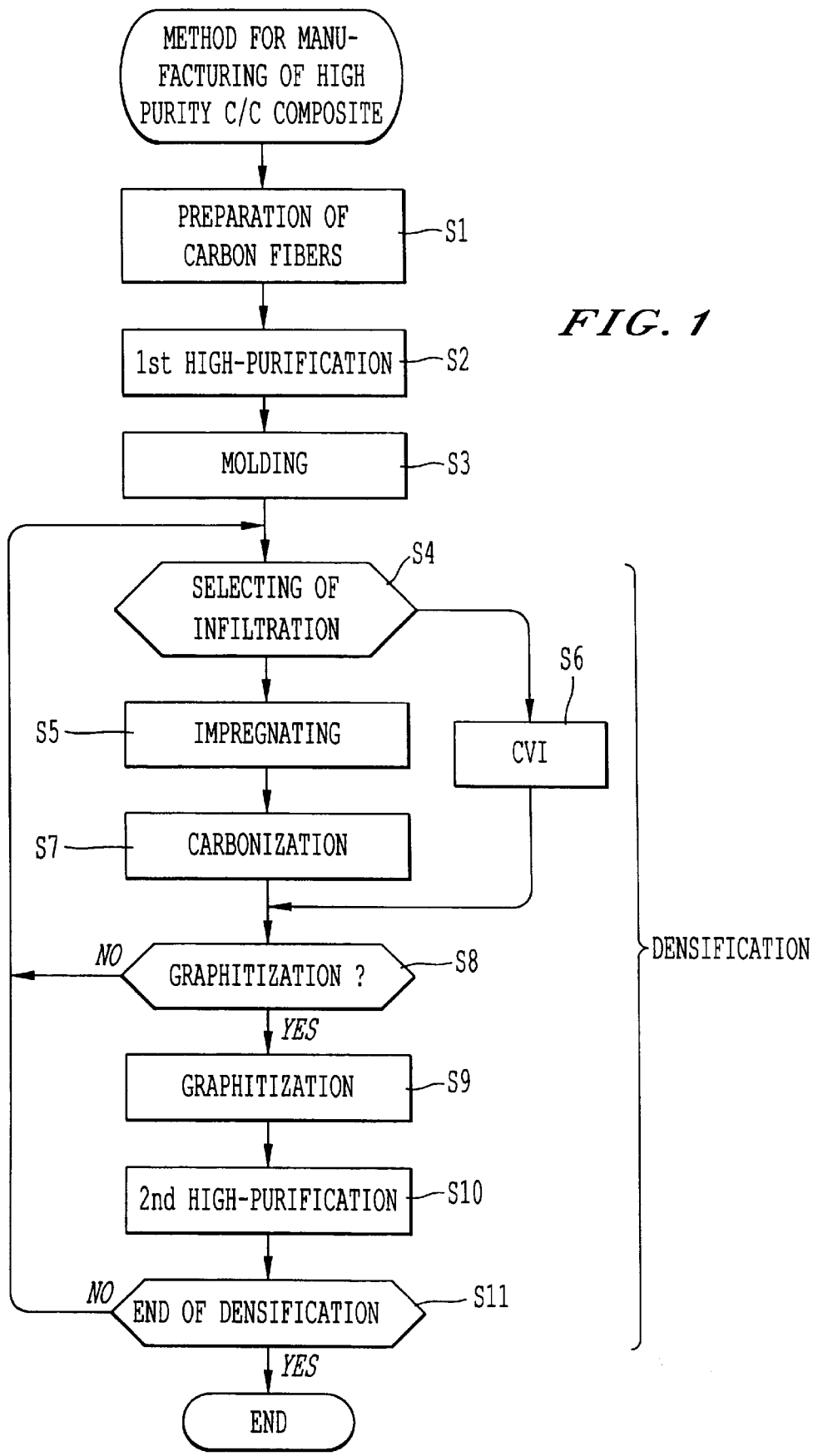
FIG. 1 is a flow chart of the manufacturing the high purity C/C composite.
Figure 2:
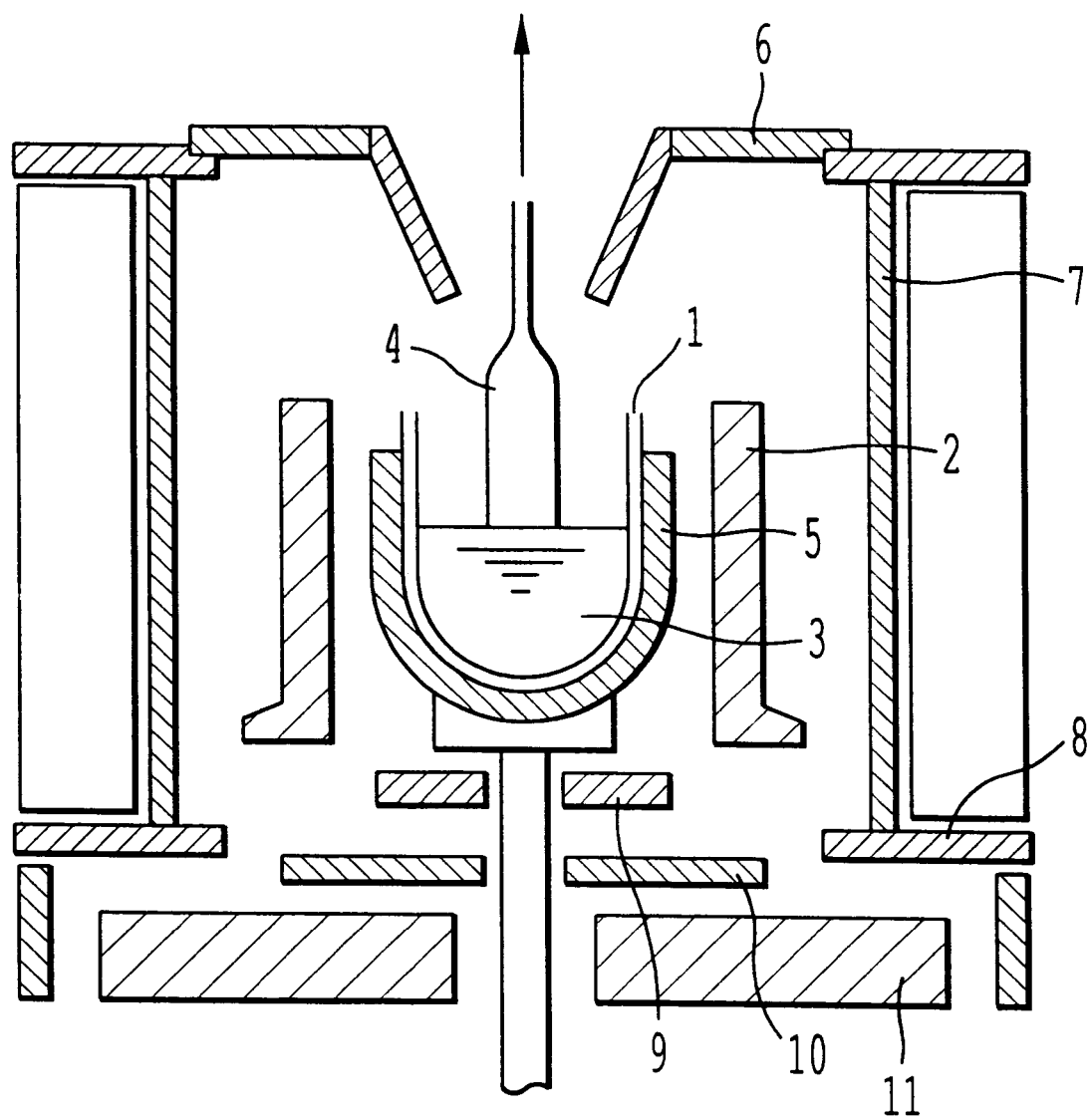
FIG. 2 is a schematic cross sectional views of the CZ apparatus.

As following, the manufacturing process of the above is explained in detail based on the flow chart of FIG. 1.

As shown in FIG. 1, the PAN or pitch carbon fibers are prepared first (S1). Then, the carbon fibers are subjected to high purification at 1,800° C. to 2,200° C. under a halogen gas atmosphere (first high purification process) (S2). The halogen gas used including halogen or gas of a compound thereof. The halogen gases which may be used include chlorine, chlorine compound, fluorine and fluorine compound, together with compounds including chlorine and fluorine in the same molecule (monochlorotrifluoromethane, trichloromonofluoromethane, dichlorofluoroethane, trichloromono-fluoroethane and the like).

Then, the carbon fibers are allowed to react with these halogen gases, where by the impurities included in carbon fibers, metallic impurities in particular, are evaporated and volatilized as halide and removed from the carbon fibers. Thereafter, after the carbon fibers are allowed to stand in the same processing furnace for a prescribed time under a halogen gas atmosphere, hydrogen gas is fed to a reaction vessel so that the impurities, such as sulfur, can be deposited as hydride and thereby be removed.

After the high purification process (first high purification process) removes the impurities in the carbon fibers, the carbon fibers are molded and baked for carbonization on depending carbon fibers (S3). And then, the infiltrating method for the carbon fibers molded member is selected (S4). When infiltrating method by impregnating with resin and/or pitch is selected, the resin and/or the pitch are prepared for the matrix and impregnating with the matrix to the carbon fibers molded member (S5). It is noted that although no particular limitation is imposed on the resin used, as long as it is the one that converts into solid phase carbon, one resin selected from the group including phenol (resole, novolak), furan, polyimide, polyamide-imide, polyether imide, polycarbodiimide and bisallyldiimide or combination thereof may be used within the range within which its property is not impaired. Solvent may be used in combination, when necessary. After the impregnated with the matrix, the molded member are baked at temperature 800 to 1,000° C., and thereby the matrix is carbonized in $N_2$ atmosphere (S7). After the carbonization (S7), it is judged whether it disposes of the graphitizing (S8). If it is judged that it does not dispose of the graphitizing (S8, NO), when go back to step 4 and repeating this process 2 to 4 times for densification. On the other hand, if it is judged that it disposes of the graphitizing (S8, YES), when go to step 9 and the graphitizing at temperature of 2,000 to 2,500° C. (S9).

On the other hand, when infiltrating method by CVI is selected, the hydrocarbon as methane, propane, benzene, toluene, xylene, dichloroethylene, dichloromethane, trichloromethane or trichloroethylene are prepared for the matrix. And then the hydrocarbon is heated in 700 to 2,000° C. to form the PyC and infiltrating to the molded member for densification (S6). After this, the member is putted in a furnace for the graphitizing at temperature of 2,000 to 2,500° C. (S9).

After the graphitizing, the halogen gas is supplied to the furnace, which is same furnace of the graphitizing with maintaining pressure of the furnace. Then, the carbon fibers and the matrix are allowed to react with these halogen gases, where by the impurities included in the carbon fibers and the matrix, the impurities in particular, are evaporated and volatilized as halide and removed from the carbon fibers and the matrix by second high purification process (S10). Thereafter, after the carbon fibers and the matrix are allowed to stand in the same furnace for a prescribed time under a halogen gas atmosphere, hydrogen gas may be fed to a reaction vessel so that the impurities, such as sulfur, can be deposited as hydride and thereby be removed.

And then, it is judged whether it disposes of the densification based on the product specification (S11). If it is judged that it disposed of the densification (S11, NO), when go back to step 4 and repeating this process 2 to 4 times for densification and high purification. Then, when the density of the member is corresponding to the product specification, it is judged that the densification isn't done (S11, YES), when the process is finished.

Above the manufacturing process, the graphitization process (S9) and the second high purification process (S10) are included the densification process. The graphitization process (S9) and the second high purification process (S10) can be disposed after the densification to thereby produce the end product.

While the present invention is described below more specifically with reference to the following examples, embodiments of the present invention are by no means limited to the following examples.

Example 1

A plain weave cloth of PAN carbon fibers (T-300 6K, made by TORAY INDUSTRIES, INC.) was cut out in 200 mm×200 mm. The cut plain weave cloth were heated to 2,000° C. under a halogen gas atmosphere for 25 hours (the first high purification process). The ash content was 76 ppm. The first high purified plain weave cloth laid 50 sheets and hot pressed at 160° C. under pressure of 3 MPa. Further the hot pressed 50 layers plain weave cloth was subjected to a pitch impregnation process and then was increased in temperature up to 1,000° C. at the heating ratio of 10° C./hr in the electric oven with nitrogen flow for baking. The impregnating with pitch and the baking process was repeated 3 times. Further the molded member was heated up to 2,000° C. for 50 hours under normal pressure of Argon gas atmosphere for the graphitization. After the graphitization,the member was high-purified at 2,200° C. for 30 hour under normal pressure of Halogen gas atmosphere for second high purification. The ash content of the C/C composite was not more than 20 ppm and the impurities as V, Ti, Fe, B and Al are mesured by ICP-OES. The impurities of the C/C composite are below the detection limit for ICP-OES.

Example 2

Except the using carbon fibers which are super yarn plain weave cloth of PAN carbon fibers (W-0202, made by TOHO RAIYON INDUSTRIES, INC.) were heated up to 800° C. for carbonization, the same processes as the Example 1. The ash content is not more than 20 ppm. The impurities of the C/C composite are below the detection limit for ICP-OES.

The ash content was measured precisely and filled in the platinum crucible having a 50 cc capacity, was heated at 950° C. in the oxygen stream (2–3 l/min) until it reached the constant weight, as aforementioned. Then, the test example was spontaneously cooled in the desiccator and the remaining ash content was measured. Also, the metal impurities were analyzed by ICP-OES (SPS-4000, made by SEIKO ELECTRIC Co.). The specimen were prepared 4 types solution for ICP-OES. The first one is a dissolved hydrochloric acid after a dissolved sodium bicarbonate. The second one is a dissolved hydrochloric acid after dissolved pyrosulfuric potassium. The third one is a dissolved nitric acid after a dissolved hydrogen fluoride. The fourth one is a dissolved hydrochloric acid. The detection limits of the elements are calculated from 3 times standard deviation of background noise level of the individual metal elements.

The high purity C/C composite of the present invention are below the detection limit for ICP-OES for almost metals, and are not more than 5 ppm for the ash content.

What is claimed is:

1. A high-purity carbon fiber reinforced carbon composite formed by a process comprising graphitizing a molded member comprising carbon fibers and a matrix comprising a carbon material, wherein said process comprises subjecting the carbon fibers to a first high purification process in the presence of a halogen gas atmosphere prior to said graphitization, thereby providing purified carbon fibers, infiltrating the purified carbon fibers one or more times with the matrix comprising a carbon material, thereby providing a molded member, graphitizing said molded member, and subjecting said graphitized molded member to a second high purification process in the presence of a halogen gas atmosphere.

2. A high-purity carbon fiber reinforced carbon composite according to claim 1, wherein the purified carbon fiber, before the graphitization process, has an impurity content of not more than 100 ppm in ash content.

3. A high-purity carbon fiber reinforced carbon composite according to claim 1, wherein after the second high-purification process, the molded member has an impurity content of 5 to 100 ppm in ash content.

4. A high-purity carbon fiber reinforced carbon composite according to claim 1, wherein the matrix is a resin.

5. A high-purity carbon fiber reinforced carbon composite according to claim 4, wherein the resin is selected from the group consisting of a phenol resin, furan resin, polyimide, polyamide-imide, polyether imide, polycarbodiimide and bisallyldiimide and combinations thereof.

6. A high-purity carbon fiber reinforced carbon composite according to claim 1, wherein the matrix is a pyrolytic carbon formed by Chemical Vapor Infiltration.

7. A high-purity carbon fiber reinforced carbon composite according to claim 6, wherein the pyrolytic carbon is formed from a material gas selected from the group consisting of an aliphatic hydrocarbon, methane, propane, an aromatic hydrocarbon, benzene, toluene, xylene, a chlorine containing hydrocarbon, dichloroethylene, dichloromethane, trichloromethane, trichloroethylene and combinations thereof.

8. A method for producing a high-purity carbon fiber reinforced carbon composite comprising subjecting a carbon fiber to a first high purification process in the presence of a halogen gas atmosphere, thereby providing a purified carbon fiber, infiltrating the carbon fibers at least one time with a matrix, thereby forming a molded member carbonizing the molded member, graphitizing the carbonized molded member, and subjecting the graphitized molded member to a second high purification process in the presence of a halogen gas atmosphere, thereby providing a high-purity carbon fiber reinforced carbon composite.

9. A method for producing a high-purity carbon fiber reinforced carbon composite according to claim 8, wherein the purified carbon fiber, before the graphitizing has an impurity content of not more than 100 ppm in ash content.

10. A method for producing a high-purity carbon fiber reinforced carbon composite according to claim 8, wherein after the second high-purification process, the molded member has an impurity content of 5 to 100 ppm in ash content.

11. A method for producing a high-purity carbon fiber reinforced carbon composite according to claim 8, wherein said graphitized molded member is treated with a second high purification process in the presence of a reduced pressure of halogen gas.

12. A method for producing a high-purity carbon fiber reinforced carbon composite according to claim 8, wherein the halogen gas is selected from the group consisting of chlorine, chlorine compounds, fluorine, fluorine compounds, compounds having chlorine and fluorine in the same molecule, monochlorotrifluoromethane, trichloromonofluoromethane, dichlorofluoroethane, trichloromono-fluoroethane, and combination thereof.

13. A method for producing a high-purity carbon fiber reinforced carbon composite according to claim 11, wherein the halogen gas is selected from the group consisting of chlorine, chlorine compounds, fluorine, fluorine compounds, compounds having chlorine and fluorine in the same molecule, monochlorotrifluoromethane, trichloromonofluoromethane, dichlorofluoroethane, trichloromono-fluoroethane, and combinations thereof.

14. A method for producing high-purity carbon fiber reinforced carbon composite according to claim 8, wherein the matrix is a pyrolytic carbon formed by Chemical Vapor Infiltration.

15. A method for producing a high-purity carbon fiber reinforced carbon composite according to claim 14, wherein the pyrolytic carbon is formed from a material gas selected from the group consisting of an aliphatic hydrocarbon, methane, propane, an aromatic hydrocarbon, benzene, toluene, xylene, a chlorine containing hydrocarbon, dichloroethylene, dichloromethane, trichloromethane, trichloroethylene, and combinations thereof.

16. A method for producing a high-purity carbon fiber reinforced carbon composite according to claim 8, wherein the matrix is a resin.

17. A method for producing a high-purity carbon fiber reinforced carbon composite according to claim 16, wherein the resin is selected from the group consisting of a phenol resin, furan resin, polyimide, polyamide-imide, polyether imide, polycarbodiimide, bisallyldiimide and combinations thereof.

* * * * *